United States Patent [19]

Reinisch

[11] 4,382,730

[45] May 10, 1983

[54] PNEUMATICALLY OPERATED SPINDLE WRENCH

[76] Inventor: Rudolf Reinisch, 5403 Ocean View Blvd., La Canada, Calif. 91011

[21] Appl. No.: 236,156

[22] Filed: Feb. 20, 1981

[51] Int. Cl.³ ............................................. B23C 5/26
[52] U.S. Cl. .................................. 409/233; 173/163; 279/8; 408/239 A
[58] Field of Search ............................. 409/233, 232; 408/239 A; 173/163; 279/8

[56] References Cited

U.S. PATENT DOCUMENTS

| | | | |
|---|---|---|---|
| 2,885,930 | 5/1959 | Adams | 409/233 |
| 3,027,812 | 4/1962 | Courtois | 409/233 |
| 3,038,386 | 6/1962 | Parske et al. | 409/233 |
| 3,205,779 | 9/1965 | Walker | 409/233 |
| 3,374,711 | 3/1968 | Saunders | 408/239 A |
| 3,481,248 | 12/1969 | Engstrom | 409/233 |
| 3,898,911 | 8/1975 | Dechussin | 409/233 |
| 4,059,066 | 11/1977 | Grassl | 116/200 |
| 4,128,043 | 12/1978 | Grassl | 409/232 |

*Primary Examiner*—Robert E. Garrett
*Attorney, Agent, or Firm*—Erik M. Arnhem

[57] ABSTRACT

A pneumatically powered spindle wrench is disposed and engaged atop the upper terminus of the powered vertical spindle of the vertical milling machine. The powered spindle wrench has a socket shaped and sized to engage the drawbar of the upper spindle terminus on signal. The tool holder is secured in and engaged in the spindle tapered aperture at the lower spindle terminus. On pneumatically powering and rotating the upper drawbar terminus of the spindle, the drawbar is unlocked and the tool holder can be removed from the spindle lower terminus. An electrically powered D.C. motor, and a hydraulically powered motor can also be equivalently substituted for the pneumatic motor drive.

4 Claims, 3 Drawing Figures

PNEUMATICALLY OPERATED SPINDLE WRENCH

BACKGROUND OF THE INVENTION

The pneumatically operated spindle wrench of this invention is classified in Class 90 Subclass 11D.

In U.S. Pat. No. 4,128,043 issued Dec. 5, 1978, R. Grassl discloses a quick release tool holder suitable for use with a vertical milling machine.

U.S. Pat. No. 4,059,066 discloses an additional improvement in quick release tool holders for a vertical milling machine.

Existing toolholder changing devices require new toolholders provided with extensions. These systems do not work on rotary mounting or release, but on a vertical retraction system. When changing toolholders in the conventional manner, one needs a wrench and hammer. The hammer is used to hit the drawbar on the top, loosening the toolholder mounted within the tapered spindle.

SUMMARY OF THE INVENTION

A simple and inexpensive pneumatically operated spindle wrench is disposed and engaged atop the upper terminus of the powered vertical spindle of a vertical milling machine. The powered spindle wrench has a socket member adaptively sized to engage the upper powered spindle drawbar terminus on signal. The tool holder, secured in the spindle tapered aperture at the lower spindle terminus, is released on pneumatically powering and rotating the upper spindle terminus, unlocking the drawbar.

A platform linear member has a first and second end terminus and a linear axis of symmetry in between. A first vane member and a second vane member are each pivotally secured normal and centrally to the first platform member and terminus, the vanes contacting each other on rotation. A lever arm is secured normal in and to the second vane member, providing manual pivoting torque to the second vane member. A rod securing means is pivotally adapted and secured in a slotted aperture disposed at the second end terminus of the platform member, the rod securing means pivoting normal to the platform linear axis of symmetry.

A rod means preferably formed in a right angle shape, is adaptively secured in the rod securing means providing means of securing the spindle wrench operatively adjacent the milling machine drawbar first terminus adjacent the automatic transmission top plate, or the like. A socket wrench is sized and adapted to operatively secure to the drawbar first terminus on signal from the lever arm. The socket wrench is operated by a pneumatic motor adapted, sized and secured adjacently through the platform linear member first end terminus. The pneumatic motor is operated by compressed gas on signal by the vane member pivotally operated by the lever arm.

The invented system permits the use of existing toolholders for mounting or releasing from an unmodified (original) tapered spindle. The toolholder is mounted on the vertical spindle. The device is handy, easy to mount and inexpensive. The time required for mounting device on the top plate or the step head is about twenty minutes. The change of toolholders requires only a few seconds.

Equivalently, an electrical powered reduction geared DC motor can be reversibly driven and secured on the platform linear member, in substitution for the pneumatic motor. A reduction geared hydraulic motor can also be equivalently substituted for the pneumatic powered motor.

Included in the objects of this invention are:

To provide a simple, convenient tool for loading and unloading a tool holder on a vertical milling machine.

To provide an ingenious tool for loading and unloading a tool holder on a vertical milling machine, without the machine operator mounting a ladder to operate the upper drawbar terminus.

To provide a simple and inexpensive tool for a vertical milling machine, which can operate to speed up the loading and unloading of a tool holder on the machine power spindle.

Other objects and advantages of this invention are taught in the following description and claims.

BRIEF DESCRIPTION OF THE DRAWINGS

The description of this invention is to be read in conjunction with the following drawings.

DESCRIPTION OF THE PREFERRED EMBODIMENT OF THE INVENTION

Figure 1:
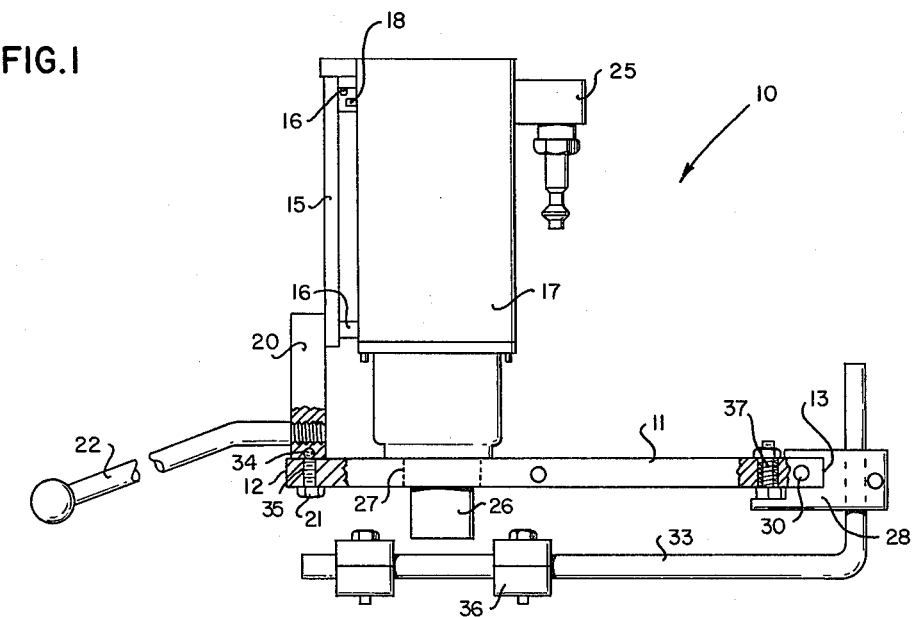
FIG. 1 is a side elevational view of the spindle wrench disposed in operational relationship with a pneumatic tool.
Figure 2:
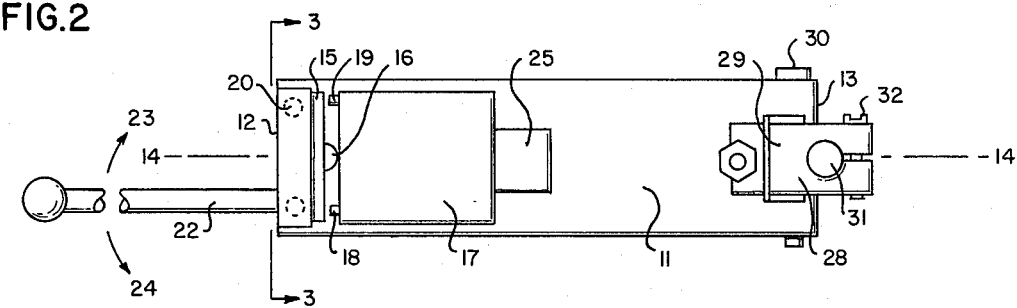
FIG. 2 is a top plan view of FIG. 1.

Referring to FIG. 1 and FIG. 2 there is shown collectively a pneumatic operated spindle wrench 10, having a platform linear member 11, with a first end terminus 12, a second end terminus 13, and a linear axis of symmetry 14. A first vane member 15 is pivotally secured by hinges 16, 16 to a pneumatic motor 17. The first vane member 15 is pivotally mounted to impinge on the two switches 18 (OFF), 19 (ON), which activate the compressed gas which drives the motor 17. The first vane member 15 is in turn activated ON or OFF by the pivoted second vane member 20 pivotally secured on the platform linear member 11 at the first terminus 12, by the pivot bolt 21. The second pivot member 20 pivotally moves the first pivot member 15, as the lever arm 22 is moved left 23 or right 24, as in FIG. 2. The nozzle means 25 introduces and conducts compressed gas into the pneumatic motor 17. The socket wrench 26 is adaptedly sized and permanently secured to the power shaft of motor 17, which in turn projects downwardly in a pressure fit aperture 27 in the platform 11, secured by a screw in the platform (not shown).

A pivot rod securing means 28 is disposed and secured in a slot 29 by a pivot bolt 30, providing pivoting of the linear member 11 normal to the axis 14. An aperture 31, secured by a bolt 32, can hold an angular mounting rod 33. The rod 33 can be adjustably mounted and secured on the automatic transmission top plate of a vertical milling machine, or in a similar position on a step head vertical milling machine which has no top plate. The spindle wrench is pivoted into engagement with the drawbar of the spindle. The spindle wrench is positioned to place the socket wrench 26 directly over the drawbar of the power spindle of the vertical milling machine, so the drawbar can be locked or unlocked as required by the milling machine operator. This invention thus eliminates the necessity for the operator to mount a ladder, chair or the like, in order to lock or unlock the drawbar mechanism, with the resultant improvement in operator safety, and operator time in changing machine tooling, during milling machine use.

At least one ball bearing 34 and a supporting compression spring 35 are disposed in platform base 11 under the vane 20, providing pivotal support for the second vane member 20. At least one second rod securing means 36 is disposed on rod means 33, providing means for securing rod means 33. The spring loaded adjustment screw 37 adjusts the base 11 angle.

Figure 3:
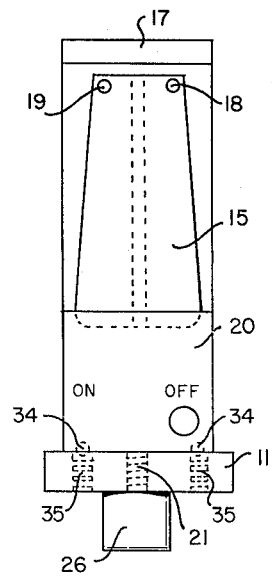
FIG. 3 is an end elevational view of the spindle wrench disposed in operational relationship with the pneumatic motor, through 3—3 of FIG. 2.

As illustrated in FIG. 3, equivalently the pneumatic motor 17 can be replaced by a reduction geared D.C. reversible motor which can be rotated in the required rotational direction by vane 15 activating the required equivalent electrical switches 18 and 19. Also, equivalently the pneumatic motor 17 can be replaced by a reduction geared hydraulic powered motor which can be operated by the equivalent switches 18 and 19. It should be noted that the use of a pneumatic motor is preferable, because the latter provides the rotary power as well as the impact required to release the tool-holder, this being actually equivalent to the time consuming conventional use of wrench and hammer as mentioned herein.

Many modifications in the milling machine spindle wrench can be made in the light of my teachings. It is understood that within the scope of the claims, the invention can be practiced otherwise than as described.

I claim:

1. In a spindle wrench for a vertical milling machine, the improvement comprising:
    a platform linear member having a first and second end terminus and a linear axis of symmetry there between,
    a first vane member pivotally secured normal and central to said first platform member end terminus,
    a second vane member pivotally secured normal and central to said first platform member end terminus and disposed parallel to said first vane member,
    a lever arm secured normal in and to said second vane member, providing manual pivoting torque to said vane member,
    a rod securing means pivotally adapted and secured in a slotted aperture disposed at said second end terminus of said platform member, said rod securing means pivoting normal to said platform linear axis of symmetry,
    a rod means adaptively secured in said rod securing means, providing means for securing said spindle wrench operatively adjacent a drawbar first terminus, and,
    a socket wrench sized and adapted to operatively secure to said drawbar first terminus on signal from said lever arm, said socket wrench rotatively powered and operated by a powered motor adaptively sized and secured through said platform linear member adjacent said linear member first terminus, said powered motor rotated on signal by said first and second vane members, pivotally manually operated by said lever arm in cooperation.

2. The further improvement modification of claim 1, wherein the powered motor is a reduction geared DC reversible motor with a pair of opposed starting switches mounted thereon.

3. The further improvement modification of claim 1, wherein the powered motor is a reduction geared hydraulic motor with a pair of opposed ON-OFF switches mounted thereon.

4. The further improvement modification of claim 1, wherein
    at least one second rod securing means disposed on said rod means provides means for securing said rod means to a top plate position of said milling machine, and
    at least one ball bearing and supporting spring means are disposed supportively under said second vane member, adjacent the second vane pivot secured in said base.

* * * * *